CLOCK CIRCUIT

Filed Jan. 11, 1963 2 Sheets-Sheet 1

INVENTOR.
WALTER S. CHAMBERLIN
BY
Christie, Parker & Hale
ATTORNEYS.

Feb. 22, 1966 W. S. CHAMBERLIN 3,237,077

CLOCK CIRCUIT

Filed Jan. 11, 1963 2 Sheets-Sheet 2

INVENTOR.
WALTER S. CHAMBERLIN
BY
Christie, Parker & Hale
ATTORNEYS.

3,237,077
Patented Feb. 22, 1966

3,237,077
CLOCK CIRCUIT

Walter S. Chamberlin, Sierra Madre, Calif., assignor to Consolidated Electrodynamics Corporation, Pasadena, Calif., a corporation of California Filed Jan. 11, 1963, Ser. No. 250,870
17 Claims. (Cl. 320—1)

The present invention relates to improvements in frequency dividing circuits, and, more specifically, to a highly accurate clock circuit design utilizing a relay controlled frequency division circuit.

In systems wherein it is desired to develop electrical signals at relatively long, predetermined and exactly timed intervals, it is common practice to employ one or more frequency division circuits. The frequency division circuit receives a reference high frequency alternating signal and develops a signal having a predetermined frequency that is a sub-harmonic of the reference signal.

Electronic circuits, as well as relay controlled circuits, for performing such frequency division functions are well known. Electronic frequency division circuits generally employ a capacitor timing circuit which is charged and discharged at predetermined rates to develop a timed series of output signals. Although the timing of the series of output signals is generally quite accurate, such electronic frequency division circuits tend to be overly sensitive to variations in supply voltage. In particular, since electronic frequency division circuits operate over, and are triggered within, the non-linear, relatively slow charging region of the capacitor to develop the output signals, variations in the supply voltages have a marked undesired effect upon the timing of the output signals.

Although such timing problems are not usually present in relay controlled frequency division circuits, relay controlled circuits generally require a large number of relays to perform any substantial degree of frequency division. Thus, relay controlled frequency division circuits become quite expensive and complex, particularly if a high order of frequency division is required.

In view of the above, the present invention provides an improved clock circuit design for developing clock signals at predetermined and exactly timed intervals. The clock circuit design, in both its basic and preferred forms, is particularly adaptable to relay controlled frequency division circuits to provide a substantial frequency division with a single relay while in the preferred form the timing of the clock pulses is substantially unaffected by changes in supply voltage.

Briefly, to accomplish the above, the basic form of the present invention comprises a capacitor and output means coupled to the capacitor for developing a clock output signal in response to each discharge of the capacitor. Coupled to the capacitor is a bistable trigger circuit for charging the capacitor when in a first stable state and for discharging the capacitor when in a second stable state. The trigger circuit includes a first circuit means for successively switching the trigger circuit between its first and second stable states at a predetermined reference rate and second circuit means responsive to charging current flowing through the capacitor for maintaining the trigger circuit in its first stable state while the capacitor is charging.

Thus, in the basic form of the clock circuit, the trigger circuit switches to its first stable state under the control of the first circuit means and remains in its first stable state under the control of the second circuit means until the capacitor has charged. When the capacitor is charged the first circuit means switches the trigger circuit to a second stable state to rapidly discharge the capacitor and develop a clock output signal. The first circuit means then returns the trigger circuit to its first stable state where it remains under the control of the second circuit means until the capacitor is again charged. This process is repeated at a predetermined rate depending upon the charging time of the capacitor to develop a series of clock signals at predetermined, exactly timed intervals.

The basic form of the clock circuit is readily adaptable to a relay controlled frequency division arrangement by including a polarized relay as the bistable trigger circuit. In such an arrangement a first winding on the polarized relay receiving a reference alternating signal comprises the first circuit means and a second winding coupled between a D.C. source and a normally open relay contact comprises the second circuit means. Switching means operated by the polarized relay closes the normally open relay contact when the polarized relay is in its first stable state to complete a charging path for the capacitor through the second winding. Charging current flowing through the second winding maintains the polarized relay in its first stable state until the capacitor is substantially charged. The switching means also completes a discharge path for the capacitor when the polarized relay is in its second stable state. By making the charging time of the capacitor long relative to the frequency of the reference alternating signal, the basic form of the present invention provides a substantial frequency division of the reference signal with but a single relay.

The preferred form of the present invention, in addition to the basic circuit arrangement previously described, includes a gating means coupled to the second circuit means of the trigger circuit and to a point in the charging path of the capacitor. The gating means possesses a predetermined voltage threshold of conduction and is arranged to develop a control signal when the voltage at the point exceeds the voltage threshold.

In the preferred form of the invention the second circuit means is responsive to the control signal to maintain the trigger circuit in its first stable state. In this manner the trigger circuit remains in its first stable state for a predetermined period of time depending upon the charging time of the capacitor. When the trigger circuit switches to its second stable state the capacitor rapidly discharges to produce a clock output signal.

By employing the gating means having a predetermined voltage threshold of conduction, the preferred form of the present invention may be arranged to operate only over the linear charging region of the capacitor. Thus, changes in the supply voltage charging the capacitor have a minimal effect upon the time at which the voltage at the point in the capacitor charging path drops below the voltage threshold of the gating means and hence has a minimal effect upon the timing of the clock signals.

The above, as well as other features of the present invention, may be more clearly understood by reference to the following detailed description when considered with the drawings, in which.

Figure 1:
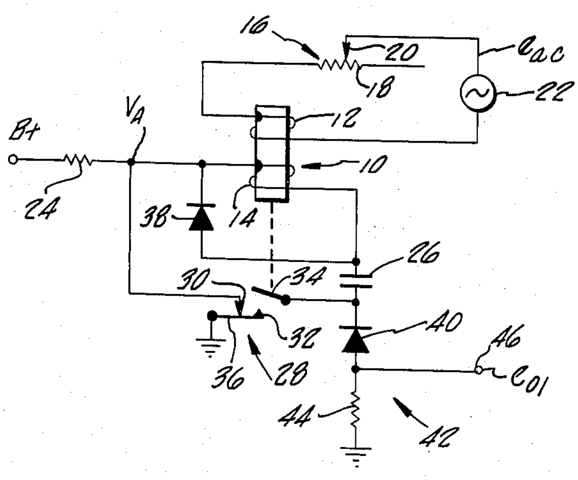
FIGURE 1 is a schematic representation of a basic form of the present invention.
Figure 2:
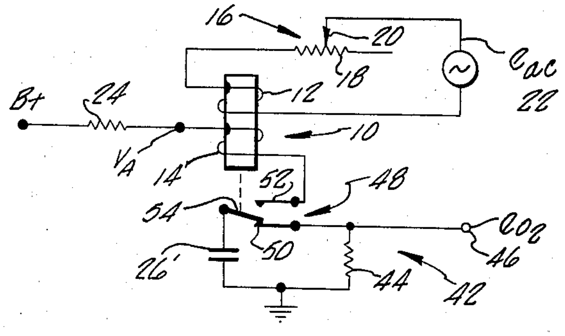
FIGURE 2 is a schematic representation of another basic form of the present invention.
Figure 3:
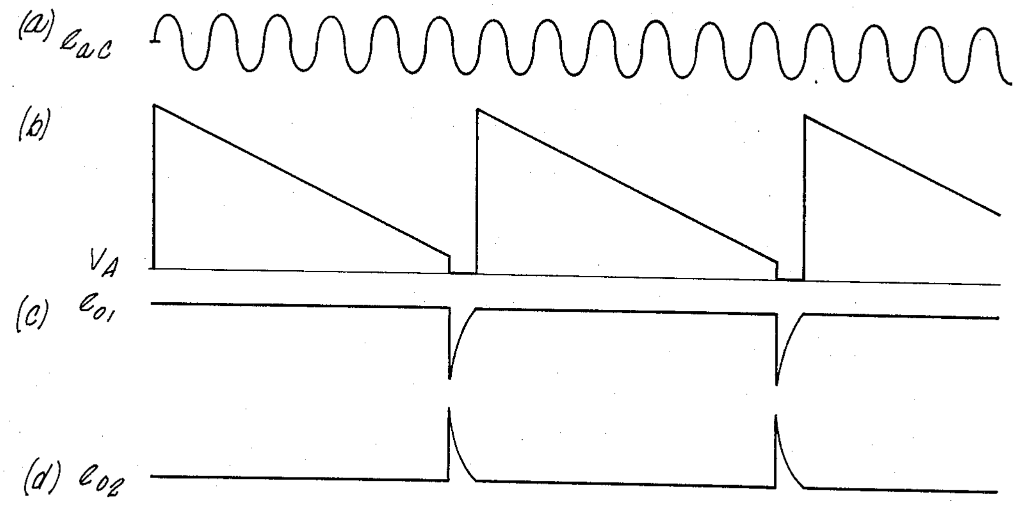
Figure 5:
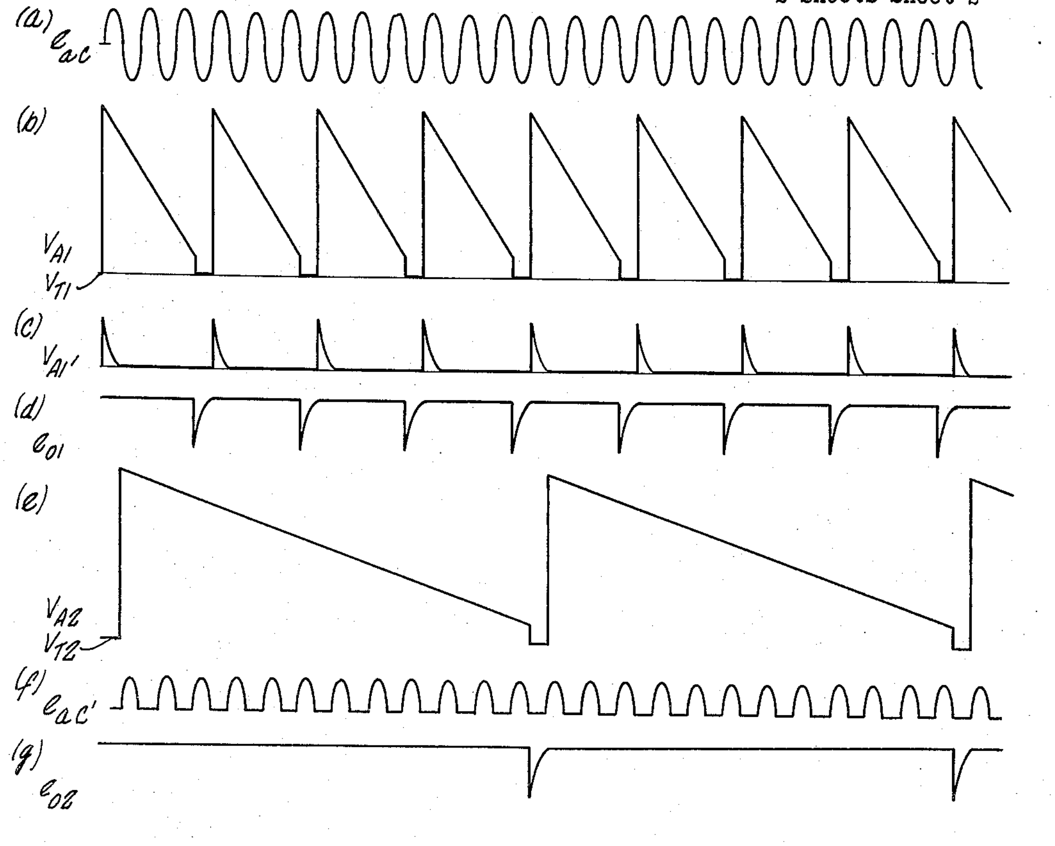
Figure 4:
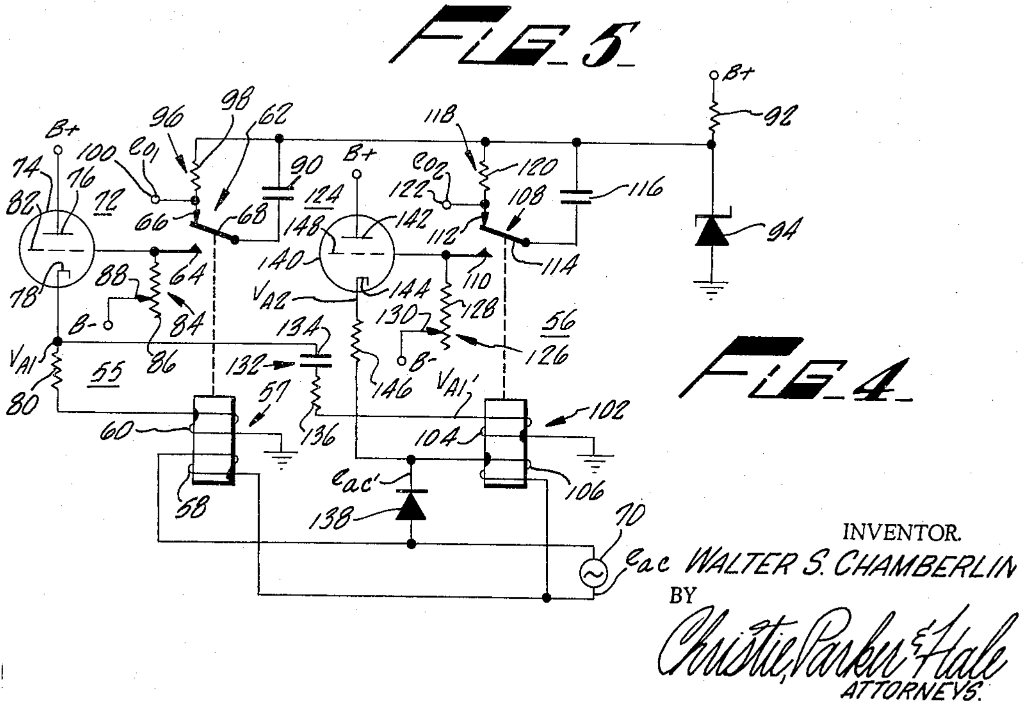

FIGURES 3(*a*), (*b*), and (*c*) are waveform representation of the voltage signals associated with FIGURE 1;

FIGURES 3(*a*), (*b*) and (*d*) are waveform representation of the voltage signals associated with FIGURE 2;

FIGURE 4 is a schematic representation of a preferred form of the present invention; and FIGURES 5(*a*) through (*g*) are waveforms of the voltage signals associated with FIGURE 4.

As previously described, the present invention both in its basic and preferred forms is particularly adaptable to relay control frequency division circuit designs. Thus, the basic forms of the present invention including the trigger circuit arrangement are illustrated in FIGURES 1 and 2 as including polarized relays.

In particular, the basic form illustrated in FIGURE 1 comprises a polarized relay 10 having a first winding 12 and a second winding 14. One terminal of the winding 12 is coupled to a potentiometer 16 including a resistor 18 and a movable arm 20. The movable arm is coupled to one terminal of a source of reference alternating signals 22. The source 22 is also coupled to the remaining terminal of the winding 12.

One terminal of the winding 14 is coupled through a resistor 24 to a source of positive potential B+ while the remaining terminal is coupled to one terminal of a capacitor 26.

In addition to the windings 12 and 14, the polarized realy 10 includes a "make-before-break" contact arrangement 28. The contact arrangement 28 includes a normally closed contact 30, a normally open contact 32, and a movable switch arm 34. The normally open contact 32 is mounted on a movable arm 36 which is normally biased to make contact with the normally closed contact 30. In the make-before-break arrangement, the movable switch arm 34 impinges upon the normally open contact 32 to move the arm 36 away from the normally closed contact 30. Thus, a normally open contact 32 closes with the switch arm 34, or makes, before the support arm 36 moves out of contact with the normally closed contact 30. Similarly, when the relay releases the normally closed contact 30 impinges upon the arm 36 before the switch arm 34 moves out of engagement with the normally open contact 32.

The normally closed contact 30 is electrically coupled to a junction of the resistor 24 and the winding 14. The movable switch arm 34 is coupled to a terminal on the capacitor 26 remote from the winding 14. The support arm 36 is normally coupled to a source of reference potential illustrated as ground. Thus, when the switch arrangement 28 is in its normal, as illustrated, a current path is completed to ground from B+ through the normally closed contact 30.

To complete the circuit arrangement for the basic form of the present invention employing a make-before-break contact arrangement, a diode 38 is coupled across the winding 14. In particular, the anode of the diode is coupled to a junction of the winding 14 and the capacitor 26 and the cathode of the diode is coupled to a junction of the resistor 24 and the winding 14.

The basic circuit arrangement also includes a diode 40 coupled between the capacitor 26 and an output circuit 42. The output circuit 42, by way of example only, includes a resistor 44 coupled to the anode of the diode 40 and to ground. An output terminal 46 is coupled to a junction of the resistor 44 and the diode 40.

As is commonly known, a polarized relay possesses first and second stable states and may be switched between its stable states under the control of current flowing through its electrical windings. In the arrangement of the polarized relay 10, the black dot notation illustrates the direction of current flow within the windings 12 and 14 which are sufficient in and of themselves to switch polarized relay 10 to its first stable state and effect a closing of the normally open contact 32. Thus, when the dotted terminal of the winding 12 is positive relative to the non-dotted terminal, current flow in the winding 12 is in a direction to switch the polarized relay to its first stable state. Similarly, current flow from the dotted to un-dotted terminals of the winding 14 perform a similar function. Current flow in an opposite direction in either of the windings 12 or 14 is in a direction to switch the polarized relay to its second stable state, which is the normal state of the clock circuit as illustrated.

In this manner, the polarized relay 10 functions as the trigger circuit of the basic form of the present invention. In particular, the first winding 12 in the circuitry associated therewith comprises the first or control circuit means for alternating the trigger circuit between its first and second stable states. The winding 14 and the circuitry associated therewith including the contact arrangement 28 comprises the second or gating circuit means for maintaining the trigger circuit in its first stable state for predetermined periods of time.

More specifically, when the clock circuit is in its second stable state, as illustrated, current is blocked from the winding 14 by the diode 40 and thus flows to ground through the normally closed contact 30. During the first positive half-cycle of the reference alternating signal $e_{ac}$, represented in FIGURE 3(*a*), current flows in the winding 12 in a direction to switch the polarized relay to its first stable state. When the polarized relay 10 switches to its first stable state, the moveable switch arm 34 impinges upon the normally open contact 32 to open the normally closed contact 30 and complete a series charging path for the capacitor 26 to ground through the second winding 14.

Current flow through the winding 14 from B+ is in a direction to switch the polarized relay to its first stable state. More particularly, the current flow from B+ to charge the capacitor has a substantially greater magnitude than the alternating current signal generated by the source 22. Thus, the current flow in the winding 14 masks or overrides the control provided by the alternating current flow in the winding 12 to maintain the polarized relay in its first stable state while the capacitor 26 is charging.

As the capacitor 26 charges, the magnitude of the current flowing in the winding 14 decreases and the voltage at the dotted terminal of the winding 14, $V_a$ illustrated in FIGURE 3(*b*), likewise reduces. When the capacitor 26 is substantially charged, the magnitude of the current flowing through the winding 14 and the voltage $V_a$ reduce to a point at which current flow in the winding 12 again controls the switching operation of the polarized relay 10.

During the next negative half-cycle of the reference signal $e_{ac}$, the polarized relay 26 is switched to its second stable state to close the normally closed contact 30 and open the normally open contact 32. A discharge path is then completed for the capacitor through the output circuit 42. The discharge path includes resistor 44, the diode 40 and the diode 38. When the capacitor 26 starts to discharge, the diode 38 switches to its high conductive state to effectively short circuit the winding 14. Thus, substantially all of the discharge current flows through the diode 38 to ground. In discharging, the capacitor 26 develops an output voltage $e_{01}$ at the output terminal 46 as represented by the waveform in FIGURE 3(*c*). The output voltage occurs upon each discharge of the capacitor 26 and thus provides an accurately timed series of output clock signals having a frequency which is substantially less than the reference signal $e_{ac}$.

Thus, in the basic form of the present invention, a substantial frequency division is provided with a single relay. The actual order of magnitude of division is controlled by the charging time of the capacitor 26 and hence by the value of the resistor 24, the resistance of the winding 14 and the value of the capacitor 26 and the magnitude of B+.

Fine control may be achieved over the actual retriggering of the polarized relay to its second stable state by the potentiometer 16. Adjustment of the potentiometer 16 controls the magnitude of the reference voltage $e_{ac}$ applied to the first winding 12. Since the polarized relay is reswitched to its second stable state when the magnitude of the current flowing in a negative direction exceeds the magnitude of current flow in the winding 14. Adjustment of the potentiometer 16 provides a fine control over the actual retriggering time of the polarized relay 10.

In the embodiment of FIGURE 1 employing a "make-before-break" type of relay contact arrangement, the diodes 38 and 40 effectively isolate the winding 14 from the discharge path of the capacitor and isolate the output circuit 42 from the charging path for the capacitor respectively. When a "break-before-make" contact arrangement is employed such isolation is unnecessary, as illustrated by the basic form of FIGURE 2.

The circuit arrangement of FIGURE 2 is very similar to that described in connection with FIGURE 1. Therefore, like reference numerals will be employed for like elements and the description will be limited to the structural and functional differences between the circuits of FIGURE 1 and 2.

As represented, the polarized relay 10 includes a "break-before-make" contact arrangement 48 including a normally closed contact 50, a normally open contact 52, and a movable switch arm 54. The normally closed contact 50 is coupled to the output terminal 46, the normally open contact 52 is coupled to the winding 14 while the movable contact arm is coupled to a capacitor 26′. The capacitor 26′ is also coupled to ground.

In operation, with particular reference to FIGURES 3(*a*), (*b*) and (*d*), during the first positive half-cycle of the reference alternating signal $e_{ac}$, the polarized relay 10 switches to its first stable state to open the normally closed contact 50 and close the normally open contact 52. A charging path is thus completed for the capacitor 26′ from B+ to ground through the winding 14.

The magnitude of the current flowing in the winding 14 overrides the alternating control provided by the alternating current flow through the winding 12 to maintain the polarized relay 10 in its first stable state while the capacitor 26′ charges. When the capacitor 26′ is substantially charged, the voltage $V_a$ and the current flow in the winding 14 reduces below the magnitude of the current flow in the winding 12. On the next negative half-cycle of the reference alternating signal the polarized relay then switches to its second stable state to open the normally open contact 52 and complete a discharge path for the capacitory 26 through the resistor 44 to produce a clock output signal as represented by $e_{o2}$ in FIGURE 3(*d*).

During the next positive half-cycle the current flow in the winding 12 again switches the polarized relay 10 to its first stable state where it is maintained under the control of the charging curnet flowing through the second winding 14 until the capacitor 26′ is substantially charged. The polarized relay then switches to its second stable state and the above process is repeated to produce a series of accurately timed clock output signals having a frequency which is substantially less than the reference alternating signal.

As previously described, the preferred form of the present invention, in addition to being particularly adaptable to relay control frequency division circuits, also represents an improvement over conventional electronic frequency division circuits in that the timing of the output pulses generated thereby is substantially unaffected by variations in the supply voltages utilized to charge the timing capacitor of the frequency division circuit. A preferred form of the present invention employing polarized relays is represented in FIGURE 4.

Briefly, the preferred form of the present invention comprises a bistable trigger circuit for completing a charging path for a capacitor from a D.C. source when in its first stable state and for completing a discharge path for the capacitor to an output means when in its second stable state. The trigger circuit includes first circuit means for successively switching the trigger circuit between its first and second stable states at a predetermined rate and second circuit means responsive to a control signal for overriding the switching operation of the first circuit means to maintain the trigger circuit in its first stable state during the time duration of the control signal. Coupled to the second circuit means of the trigger circuit and to a point in the charging path of the capacitor is a gating circuit means having a predetermined voltage threshold of conduction. The gating circuit means is arranged to generate a control signal when the voltage at the point of connection to the capacitor charging path exceeds the predetermined threshold of conduction. By proper selection of the voltage threshold of conduction, the clock circuit is arranged to generate the control signal only during the linear charging portion of the capacitor. Thus, changes in the supply voltage charging the capacitor have a minimal effect upon the point in time at which the connection point to the gating circuit drops below the threshold of conduction and hence a minimal effect upon the timing of the output clock signals generated by the preferred form of the present invention.

The preferred form of the present invention is illustrated in FIGURE 4 as including first and second stages 55 and 56. Although the circuitry of the first and second stages is quite similar, they may be arranged to provide substantially different degrees of frequency division. For example, the first stage 55 may be arranged to provide a one-to-three frequency division while the second stage, which is responsive to electrical signals generated by the first stage, may be arranged to provide a one-to-four frequency division of the electrical signals generated by the first stage. Thus, the combination of the two stages, as illustrated by the waveforms of FIGURE 5, provides a one-to-twelve frequency division of a reference alternating signal $e_{ac}$.

As briefly described, the preferred form of the present invention is particularly adaptable to relay control frequency division circuit designs. Accordingly, by way of example only, the preferred form of the present invention is illustrated as including polarized relays. In particular, the first stage 55 as illustrated, includes a polarized relay 57 having a first winding 58, a second winding 60, and a "break-before-make" contact arrangement 62. The contact arrangement 62 includes a normally open contact 64, a normally closed contact 66, and a movable switch arm 68.

The winding 58 is coupled to receive the alternating signals output $e_{ac}$ of an alernating current signal source 70 while the winding 60 is coupled between ground and a first gating circuit means 72.

By way of example only, the first gating circuit means 72 is illustrated as comprising a triode 74 having an anode 76 coupled to a source of positive potential B+, a cathode 78 coupled through a resistor 80 to the winding 60, and a control grid 82 coupled to the normally open contact 64. The grid 82 is also coupled to a potentiometer 84 including a resistor 86 and a movable contact arm 88. The movable contact arm is coupled to a source of negative potential B− which normally biases the triode 74 to a nonconductive state.

The triode 74 thus described is arranged in a cathode follower configuration and possesses a predetermined voltage threshold of conduction $V_{T1}$ determined by the voltage at the grid 82 required to switch the triode 74 to a state of conduction. For example, when the grid 82 becomes positive relative to ground potential, the triode 74 switches to a conductive state to pass a current through the resistor 80 to the winding 60 of the polarized relay 57.

To complete the first stage, the preferred form of the present invention includes a capacitor 90 coupled between the movable switch arm 68 and a resistor 92. The resistor 92, in turn, is coupled between B+ and a zener diode 94 having its anode coupled to ground. The zener diode functions in a conventional manner to provide voltage regulation of the voltage at a junction of the zener diode and the resistor 92 and hence over the voltage applied to the capacitor 90.

Coupled to the capacitor 90 is an output circuit 96 including, by way of example, a resistor 98, coupled between the capacitor and the normally closed contact 66, and an output terminal 100 coupled to the normally closed contact 66.

Similar to the first stage 55, the second stage 56 of the clock circuit comprises a polarized relay 102 including a first winding 104, a second winding 106 and a "break-before-make" contact arrangement 108 including a normally open contact 110, a normally closed contact 112, and a movable switch 114. The movable switch 114 is coupled to a capacitor 116 which is, in turn, coupled to a junction of the resistor 92 and the zener diode 94. The normally closed contact is coupled to an output circuit 118 comprising, by way of example, a resistor 120 and an output terminal 122. The normally open contact 110 is coupled to a second gating circuit 124 and to a potentiometer 126 comprising a resistor 128 and a movable arm 130 coupled to B—.

The winding 104 of the polarized relay 102 is coupled through a series R-C circuit 132 to the cathode 78 of the triode 74. The R-C circuit includes a capacitor 134 for effecting a differentiation of the voltage at the cathode 78 and a resistor 136 for attenuating the differentiated voltage signal.

The winding 106 is also coupled to the second gating circuit 124 and through a diode 138 to one terminal of the alternating current source 70. The diode 138 is arranged to pass only a positive-going half-cycle which are 180° out of phase with the positive-going half cycles of the reference alternating signal $e_{ac}$ passing through the winding 58 of the polarized relay 52 and produces a pulsating signal $e_{ac}'$ in the winding 106. The waveform of the signal $e_{ac}'$ is illustrated in FIGURE 5(*f*).

The second gating circuit means 124 is substantially the same as the gating circuit means 72 for the first stage 55 of the clock circuit and includes a triode 140 having an anode 142 coupled to B+, a cathode 144 coupled through a resistor 146 to the winding 106 and a control grid 148 coupled to the normally open contact 110 and to B— through the potentiometer 126. Due to the negative bias provided by B— the triode 140 is normally in a nonconductive state and possesses a predetermined voltage threshold of conduction $V_{T2}$ determined by the voltage at the control grid 148 required to switch the triode 140 to a conductive state. When in a conductive state the triode 140 produces a current signal in the winding 106.

In operation, during the first positive half-cycle of the reference alternating signal $e_{ac}$ current flows in the winding 58 to switch the polarized relay 57 to its first stable state, close the normally open contact 64, and open the normally closed contact 66. The closing of the contact 64 completes a charging path for the capacitor 90 from B+ to B—. In addition, when contact 64 is closed the regulated voltage applied to the capacitor 90 is initially reflected thereacross and causes the voltage at the control grid 82 to rise above the voltage threshold of the triode 74. The triode 74 then switches to its conductive state with the voltage $V_{A1}$ at the cathode 78 following the voltage on the control grid 82.

With the triode 74 in its conductive state a control current signal passes through the winding 60 to ground. The control current signal is of an initial magnitude sufficient to override or mask the alternating current signal control provided by the current flow in the winding 58 and thus maintains the polarized relay 57 in its first stable state.

As the capacitor 90 charges, the voltage at the control grid 82 decreases and is reflected as a decrease in the voltage $V_{A1}$ at the cathode 78 (see FIGURE 5(*b*)). As $V_{A1}$ decreases, the magnitude of the control signal also decreases. When the magnitude of the control signal drops below the magnitude of the alternating current flow in the winding 58, the state of the polarized relay 57 is again under the control of the reference alternating signal $e_{ac}$. In particular, during the next negative going half-cycle of $e_{ac}$, the current flow in the winding 58 switches the polarized relay 57 to its second stable state. The switching of the polarized relay to its second stable state opens the contact 64, completes a discharge path for the capacitor 90 through the output circuit 96, and effects a negative biasing of the control grid 82 through the potentiometer 84. The return of the negative bias to the control grid 82 switches the triode 74 to a nonconductive state and terminates the first control signal.

The discharge of the capacitor 90 through the output circuit 96 produces an output voltage signal $e_{o1}$ at the output terminal 100 as illustrated by the waveforms in FIGURE 5(*d*).

During the next positive going half-cycle of $e_{ac}$ current flow through the winding 58 again switches the polarized relay 57 to its first stable state and the operation repeats itself cyclically at a rate determined by the time constant of the charging path for the capacitor 90. The charging path for the capacitor 90 includes the resistor 92, the capacitor 90 and the potentiometer 84. By controlling the value of these components the rate of operation of the first stage 55 to generate successive output pulses may be controlled to include a predetermined number of cycles of the reference alternating signal. In particular, by controlling the position of the moveable arm 88 of the potentiometer 84, the time constant of the charging path of the capacitor 90 may be adjusted such that the capacitor 90 charges to a voltage sufficient to allow the reference alternating current flowing through the winding 58 to switch the polarized relay 57 to its second stable state every third cycle of the reference alternating signal. Such an operation is represented by the waveforms of FIGURES 5(*a*), (*b*), and (*d*). Thus, the output signals $e_{o1}$ occur at every third cycle of the reference alternating signal $e_{ac}$ to affect a one-to-three time division of the reference alternating signal.

While the first stage 55 of the clock circuit is alternating between its first and second stages to generate a series of output signals $e_{o1}$, the second stage 56 is also operating to produce a series of clock output signals at the output terminal 122 at a predetermined frequency lower than the frequency of operation of the first stage 55. In particular, during the first negative-going half-cycle of the reference alternating signals $e_{ac}$, a first positive-going pulse $e_{ac'}$ is applied to the winding 106 of the polarized relay 102 to cause the polarized relay 102 to switch to its first stable state. In switching to its first stable state, the polarized relay 102 closes the normally open contact 110 to complete a charging path for the capacitor 116 between B+ and B—. In addition, when the normally open contact 110 closes the regulated voltage applied to the capacitor 116 is initially reflected thereacross to the control grid 148 of the triode 140. The voltage at the control grid 148 thus increases above the voltage threshold $V_{T2}$ of the triode 140 to switch the triode to a conductive state with the voltage $V_{A2}$ at the cathode 144 following the voltage on the control grid 148.

With the triode 140 in a conductive state a control current signal passes through the winding 106. The control current signal is of an initial magnitude sufficient to override or mask any control of the state of the polarized relay 102 provided by current flow through the winding 104. The control current signal passing through the winding 106 maintains the polarized relay 102 in its first stable state.

As the capacitor 116 charges, the voltage at the control grid 148 decreases and is reflected as a decrease in the voltage $V_{A2}$ at the cathode 144 (see FIGURE 5(*e*)). As $V_{A2}$ decreases, the magnitude of the control signal also decreases. When the magnitude of the control signal drops below the magnitude of the current flowing through the winding 104, the state of the polarized relay 102 is placed under the control of the current signal applied to the winding 104.

Current flow in the winding 104 is under the control of the output voltage $V_{A1}'$ from the series R-C circuit 132 represented in FIGURE 5(*c*). As previously described, the voltage $V_{A1}'$ is a differentiated signal version of the voltage $V_{A1}$ appearing at the cathode 78 of the triode 74.

Thus, a current pulse is passed through the winding 104 of the polarized relay 102 during the positive half-cycles of the reference alternating signal $e_{ac}$ at which the polarized relay 57 switches to its first stable state. When the current pulse applied to the winding 104 exceeds the control current passing through the winding 106 the polarized relay 102 switches to its second stable state. The switching of the polarized relay 102 to its second stable state opens the contact 110, completes a discharge path for the capacitor 116 through the output circuit 118, and effects the negative biasing of the control grid 148 through the potentiometer 126. The return of the negative bias to the control grid 148 switches the triode 140 to a nonconductive state and terminates a second control signal.

The discharge of the capacitor 116 through the output circuit 118 produces an output voltage signal $e_{o2}$ at the output terminal 122 as illustrated by the waveforms of FIGURE 5(*g*).

During the next negative-going half-cycle of $e_{ac}$, a current pulse $e_{ac}'$ through the winding 116 again switches the polarized relay 102 to its first stable state and the operation repeats itself cyclically at a rate determined by the time constant of the charging path for the capacitor 116.

The charging path of the capacitor 116 comprises the resistor 92, the capacitor 116 and the potentiometer 126. By proportioning the value of these components the time constant of the charging path for the capacitor 116 may be adjusted such that the second stage 56 operates at a predetermined rate to develop output clock signals at the output terminal 122 after the lapse of a predetermined number of cycles of the reference signal $e_{ac}$. In particular, by adjusting the position of the moveable arm 130 of the potentiometer 126, the value of the time constant of the charging path for the capacitor 116 may be adjusted such that the polarized relay 102 switches to its second stable state under the control of the current flowing through the winding 104 in response to every fourth voltage pulse $V_{A1}'$ as represented by the waveforms in FIGURE 5. In this manner the first and second stages of the clock circuit cooperate with each other to produce a series of clock output signals $e_{o2}$, one for every twelve cycles of the reference alternating signals $e_{ac}$. Thus, the preferred form of the present invention provides a substantial degree of frequency division of the reference alternating signal while employing a single polarized relay for each stage of the clock circuit.

Furthermore, in the preferred form of the present invention the timing of the clock output signals generated thereby is substantially uneffected by changes in the supply voltages charging the capacitors. In particular, in the preferred form of the present invention the capacitors 90 and 116 are charged between positive and negative voltage sources. Thus, when the magnitude of the reference A.C. signal in the winding 58 and the pulse current signal in the winding 104 exceed in magnitude the respective control signals in the windings 60 and 106, the charge and voltage on the associated capacitors are rapidly increasing at a substantially linear rate. Therefore, changes in the supply voltage applied to the capacitors have a minimal effect upon the time at which the control signals drop below the magnitude of the reference alternating signals and hence have a minimal effect upon the timing of the output signals generated by the clock signals.

What is claimed is:

1. A clock circuit, comprising:
a capacitor;
output means coupled to the capacitor for developing a clock output signal in response to a discharge of the capacitor;
and a bistable trigger circuit coupled to the capacitor for charging the capacitor when in a first stable state and discharging the capacitor when in a second stable state, the trigger circuit including first circuit means for successively switching the trigger circuit between its first and second stable states at a predetermined rate and second circuit means responsive to a charging current flowing through the capacitor for maintaining the trigger circuit in its first stable state while the capacitor is charging.

2. A clock circuit comprising:
a capacitor;
output means coupled to the capacitor for developing a clock output signal in response to a discharge of the capacitor;
a D.C. source;
and a bistable trigger circuit coupled to the capacitor for completing a charging path for the capacitor from the source when in a first stable state and for completing a discharge path of the capacitor to the output means when in a second stable state, the trigger circuit including first circuit means for successively switching the trigger circuit between its first and second stable states at a predetermined rate and second circuit means responsive to a charging current flowing through the capacitor for maintaining the trigger circuit in its first stable state while the capacitor is charging.

3. A clock circuit, comprising:
a capacitor;
output means coupled to the capacitor for developing a clock output signal in response to a discharge of the capacitor;
a D.C. source;
a bistable trigger circuit coupled to the capacitor for completing a charging path for the capacitor from the source when in a first stable state, the charging path having a predetermined time constant, and for completing a discharge path for the capacitor to the output means when in a second stable state, the discharge path having a time constant which is substantially less than the time constant of the charging path, the trigger circuit including first circuit means for successively switching the trigger circuit between its first and second stable states at a predetermined rate and second circuit means responsive to a charging current flowing through the capacitor for maintaining the trigger circuit in its first stable state while the capacitor is charging;
and means for adjusting the time constant of the charging path.

4. A clock circuit, comprising:
a capacitor;
output means coupled to the capacitor for developing a clock output signal in response to a discharge of the capacitor;
a D.C. source;
and a polarized relay having first and second stable states and including a first winding receiving an input signal for successively switching the polarized relay between its first and second stable states at a predetermined frequency, a second winding coupled in series with the D.C. source for passing a direct current from the D.C. source sufficient to maintain the polarized relay in its first stable state, and switching means for completing a series charging path for the capacitor from the D.C. source through the second winding when the polarized relay is in its first stable state and for completing a discharge path for the capacitor through the output means when the polarized relay is in its second stable state such that the polarized relay remains in its first stable state until the capacitor is charged.

5. A clock circuit, comprising:
a capacitor;
output means coupled to the capacitor for developing a clock output signal in response to a discharge of the capacitor;

a D.C. source;
a bistable trigger circuit for completing a charging path for the capacitor from the source when in a first stable state and for completing a discharge path for the capacitor to the output means when in a second stable state, the trigger circuit including first circuit means for successively switching the trigger circuit between its first and second stable state at a predetermined rate and second circuit means responsive to a control signal for over-riding the switching operation of the first circuit means to maintain the trigger circuit in its first stable state;
and gating means having a predetermined voltage threshold of conduction coupled to the second circuit means and to a point in the charging path of the capacitor for developing the control signal while the voltage at the point exceeds the voltage threshold of conduction.

6. A clock circuit, comprising:
a capacitor;
output means coupled to the capacitor for developing a clock output signal in response to a discharge of the capacitor;
a first voltage source for developing a positive direct voltage signal relative to a predetermined reference voltage;
a second voltage source for developing a negative direct voltage relative to the predetermined reference voltage;
a bistable trigger circuit for completing a charging path for the capacitor between the first and second voltage source when in a first stable state, the charging path having a predetermined time constant, and for completing a discharge path for the capacitor to the output means when in a second stable state, the trigger circuit including first circuit means for successively switching the trigger circuit between its first and second stable states at a predetermined rate and second circuit means responsive to a control signal for over-riding the switching operation of the first circuit means to maintain the trigger circuit in its first stable state;
and normally nonconductive gating means having a predetermined voltage threshold of conduction coupled to a point in the charging path and to the second circuit means for switching to a conductive state to develop the control signal while the voltage of the point exceeds the voltage threshold of conduction.

7. The apparatus defined in claim 6 including means for adjusting the time constant of the charging path for the capacitor.

8. A clock circuit, comprising:
a capacitor;
output means coupled to the capacitor for developing a clock output signal in response to a discharge of the capacitor;
a D.C. source;
a polarized relay having first and second stable states and including a first winding receiving an electrical signal for successively switching the polarized relay between its first and second stable states at a predetermined frequency, a second winding for receiving a control signal to maintain the polarized relay in its first stable state, and switching means coupled to the capacitor for completing a charging path for the capacitor from the D.C. source when the polarized relay is in its first stable state and for completing a discharging path for the capacitor to the output means when the polarized relay is in its second stable state;
and normally nonconductive gating means having a a predetermined voltage threshold of conduction coupled to the second winding and a point in the charging path for switching to a conductive state to develop the control signal while the voltage at the point exceeds the voltage threshold of conduction.

9. A clock circuit, comprising:
a capacitor;
output means coupled to the capacitor for developing a clock output signal in response to a discharge of the capacitor;
a first voltage source for developing a positive direct voltage signal relative to a predetermined reference voltage;
a second voltage source for developing a negative direct voltage signal relative to the predetermined voltage;
a polarized relay having first and second stable states and including a first winding receiving an electrical signal for successively switching the polarized relay between its first and second stable states at a predetermined frequency, a second winding for receiving a control signal to maintain the polarized relay in its first stable state, and switching means coupled to the capacitor for completing a charging path for the capacitor between the first and second voltage sources when the polarized relay is in its first stable state and for completing a discharge path for the capacitor to the output means when the polarized relay is in its second stable state;
and normally nonconductive gating means having a predetermined voltage threshold of conduction coupled to a point in the charging path and to the second winding for switching to a conductive state to develop the control signal while the voltage at the point exceeds the voltage threshold of conduction.

10. A clock circuit, comprising:
a capacitor;
output means coupled to the capacitor for developing a clock output signal in response to a discharge of the capacitor;
a first voltage source for developing a positive direct voltage signal relative to a predetermined reference voltage;
a second voltage source for developing a negative direct voltage signal relative to the predetermined reference voltage;
a polarized relay having first and second stable states and including a first winding receiving an electrical signal for successively switching the polarized relay between its first and second stable states at a predetermined rate, a second winding for receiving a control signal to maintain the polarized relay in its first stable state, and switching means for completing a charging path for the capacitor between the first and second voltage sources when the polarized relay is in its first stable state and for completing a discharge path for the capacior to the output means when the polarized relay is in its second stable state;
and a normally nonconductive triode having a predetermined voltage threshold of conduction and including an anode coupled to the first voltage source, a grid coupled to a point in the charging path between the capacitor and the second voltage source and a cathode coupled through a resistor to the second winding of the polarized relay for switching to a conductive state to develop the control current signal in the second winding when the voltage at the grid exceeds the predetermined voltage threshold of conduction.

11. A clock circuit, comprising:
a first capacitor;
a D.C. source;
a first bistable trigger circuit for completing a charging path for the capacitor from the source when in a first stable state, the charging path having a predetermined time constant, and for completing a discharge path for the capacitor when in a second stable state, the first trigger circuit including first circuit means receiving a first and a second series of electrical signals for switching the trigger circuit to its first stable state in response to the signals of the first series and for switching the trigger circuit to its second stable state in response to the signals of the second series, the electrical signals of the second series being synchronous with the signals of the first series and occurring at predetermined times alternate to the signals of the first series such that the first circuit means alternates the trigger circuit between its first and second stable states at a predetermined frequency, and second circuit means responsive to a first control signal for over-riding the switching operation of the first circuit means to maintain the trigger circuit in its first stable state;

first gating means having a predetermined voltage threshold of conduction coupled to a point in the charging path of the first capacitor and the second circuit means of the first trigger circuit for developing the first control signal while the voltage at the point exceeds the voltage threshold of the first gating means;

a second capacitor;

output means coupled to the second capacitor for developing a clock signal in response to a discharge of the capacitor;

a second bistable trigger circuit for completing a charging path for the second capacitor from a D.C. source when in a first stable state, the charging path for the second capacitor having time constant greater than the time constant of the charging path for the first capacitor, and a discharge path for the capacitor to the output means when in a second stable state, the second trigger circuit including first circuit means responsive to the first control signal for switching the second trigger circuit to its second stable state and second gating means having a predetermined voltage of electrical signals for switching the second trigger circuit to its first stable state and a second control signal for maintaining the second trigger circuit in its first stable state;

and second gating means having a predetermined voltage threshold of conduction coupled to a point in the charging path for the second capacitor and to the second circuit means of the second trigger circuit for developing the second control signal while the voltage at the point in the charging path for the second capacitor exceeds the voltage threshold of the second gating circuit.

12. A clock circuit, comprising:

a first capacitor;

a first voltage source for developing a positive direct voltage signal relative to a reference voltage;

a second voltage source for developing a negative direct voltage signal relative to the reference voltage;

a first bistable trigger circuit for completing a charging path for the first capacitor between the first and second voltage sources when in a first stable state, the charging path having a predetermined time constant, and for completing a discharge path for the capacitor when in a second stable state, the first trigger circuit including first circuit means receiving a first and a second series of electrical signals for switching the trigger circuit to its first stable state in response to the signals of the first series and for switching the trigger circuit to a second stable state in response to the signals of the second series, the electrical signals of the second series being synchronous with the electrical signals of the first series and occurring at predetermined times alternate to the signals of the first series such that the first circuit means alternates the first trigger circuit between its first and second stable states at a predetermined frequency, and second circuit means responsive to a first control signal for over-riding the switching operation of the first circuit means to maintain the trigger circuit in its first stable state;

a first normally nonconductive gating means having a predetermined voltage threshold of conduction coupled to a point in the charging path of the first capacitor and to the second circuit means of the first trigger circuit for switching to a conductive state to develop the first control signal while the voltage at the point exceeds the voltage threshold of the first gating means;

a second capacitor;

output means coupled to the second capacitor for developing a clock output signal in response to a discharge of the second capacitor;

a second bistable trigger circuit for completing a charging path for the second capacitor between the first and second voltage sources when in a first stable state, the charging path for the second capacitor having a time constant greater than the charging path for the first capacitor, and for completing a discharge path for the second capacitor to the output means when in a second stable state, the second bistable trigger circuit including first circuit means responsive to the first control signal for switching the second trigger circuit to its second stable state and second circuit means receiving the second series of electrical signals for switching the second trigger circuit to its first stable state and receiving a second control signal for maintaining the second trigger circuit in its first stable state;

and second normally nonconductive gating means having a predetermined threshold of conduction coupled to a point in the charging path for the second capacitor and to the second circuit means of the second trigger circuit for switching to a conductive state to develop the second control signal while the voltage at the point in the charging path for the second capacitor exceeds the voltage threshold of the second gating means.

13. The apparatus defined in claim 12 including differentiating circuit means coupled between the first gating means and the first circuit means of the second trigger circuit for differentiating the first control signal, the first circuit means of the second trigger circuit being responsive to the output of the differentiating circuit means.

14. The apparatus defined in claim 12 including means for adjusting the time constants of the charging paths for the first and second capacitors.

15. A clock circuit comprising:

a first capacitor;

a first voltage source for developing a positive direct voltage signal relative to a reference voltage;

a second voltage source for developing a negative direct voltage signal relative to the reference voltage;

a first polarized relay having first and second stable states and including a first winding means receiving a first and a second series of electrical signals for switching the first polarized relay to its first stable state in response to the signals of the first series and for switching the first polarized relay to its second stable state in response to signals of the second series, the signals of the second series being synchronous with the signals of the first series and occurring at predetermined times alternate to the signals of the first series such that the first winding means functions to alternate the first polarized relay between its first and second stable states at a predetermined frequency, second winding means receiving a first control signal for over-riding the switching operation of the first winding means to maintain the first polarized relay in its first stable state, and a switching means for completing a charging path for the first capacitor between the first and second voltage sources when the first polarized relay is in a first stable state, the charging path having a predetermined time constant, and for completing a discharge path for the first capacitor when the polarized relay is in its second stable state;

a first gating means having a predetermined voltage threshold of conduction coupled to a point in the charging path of the first capacitor and the second winding means for developing the first control signal while the voltage at the point exceeds the voltage threshold;

a second capacitor;

output means coupled to the second capacitor for developing a clock output signal in response to a discharge of the second capacitor;

a second polarized relay having first and second stable states and including a first winding means for receiving the first control signal to switch the second polarized relay to its second stable state, second winding means receiving the second series of electrical signals for switching the second polarized relay to its first stable state and receiving a second control signal for maintaining the second polarized relay in its first stable state, and switching means for completing a charging path for the second capacitor betwen the first and second voltage sources when the second polarized relay is in its first stable state, the charging path having a time constant which is greater than the time constant of the charging path for the first capacitor, and for completing a discharge path for the second capacitor through the output means when the second polarized relay is in its second stable state;

and second gating means having a predetermined voltage threshold of conduction coupled between a point in the discharge path of the second capacitor and the second winding means of the second polarized relay for developing the second control signal while the voltage at the point in the charging path for the second capacitor exceeds the voltage threshold of the second gating means.

16. The apparatus defined in claim 15 including a differentiating circuit means coupled between the first gating means and the first winding means of the second polarized relay for differentiating the first control signal, the first winding means of the second polarized relay being responsive to the output of the differentiating means.

17. A clock circuit, comprising:

a trigger circuit having first and second stable states for developing a predetermined clock output signal when in its second stable state and including control circuit means receiving a first and a second series of electrical signals for switching the trigger circuit to its first stable state in response to the signals of the first series and for switching the trigger circuit to its second stable state in response to the signals of the second series, the signals of the second series being synchronous with the signals of the first series and occurring at predetermined times alternate to the signals of the first series such that the control circuit means functions to alternate the trigger circuit between its first and second stable states at a predetermined frequency, and gating circuit means for over-riding the switching operation of the first circuit means to maintain the trigger circuit in its first stable state for predetermined periods of time.

No references cited.

IRVING L. SRAGOW, *Primary Examiner.*